United States Patent
Zhang (10) Patent No.: US 7,266,287 B2
(45) Date of Patent: Sep. 4, 2007

(54) USING BACKGROUND AUDIO CHANGE DETECTION FOR SEGMENTING VIDEO

(75) Inventor: Tong Zhang, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1402 days.

(21) Appl. No.: 10/020,255

(22) Filed: Dec. 14, 2001

(65) Prior Publication Data

US 2003/0112261 A1  Jun. 19, 2003

(51) Int. Cl.
*G11B 27/00* (2006.01)
*H04N 5/91* (2006.01)

(52) U.S. Cl. .................. 386/52; 386/75; 386/104; 360/13; 369/28.01; 369/83

(58) Field of Classification Search .............. 386/1, 386/4, 5, 39, 45, 46, 52, 68, 69, 70, 75, 95, 386/96, 104, 111, 125, 126; 369/27, 28, 369/30.07, 32, 83; 360/5, 13, 69, 71; 348/533, 348/554, 571, 699, 700, 907; 725/22, 240
See application file for complete search history.

(56) References Cited

U.S. PATENT DOCUMENTS

| | | | |
|---|---|---|---|
| 5,550,965 A | 8/1996 | Gabbe et al. | 395/154 |
| 5,642,174 A | 6/1997 | Kazui et al. | 348/700 |
| 5,649,060 A | 7/1997 | Ellozy et al. | 395/2.87 |
| 5,822,024 A * | 10/1998 | Setogawa et al. | 348/425.1 |
| 5,828,809 A * | 10/1998 | Chang et al. | 386/69 |
| 6,072,542 A | 6/2000 | Wilcox et al. | 348/722 |
| 6,094,234 A * | 7/2000 | Nonomura et al. | 348/700 |
| 6,347,114 B1 * | 2/2002 | Blanchard | 375/240 |
| 6,449,021 B1 * | 9/2002 | Ohta et al. | 348/700 |
| 6,763,510 B2 * | 7/2004 | Tanaka | 716/11 |
| 6,973,256 B1 * | 12/2005 | Dagtas | 386/46 |
| 2005/0020223 A1 * | 1/2005 | Ellis et al. | 455/186.1 |

FOREIGN PATENT DOCUMENTS

WO  WO 01/33863  5/2001

\* cited by examiner

*Primary Examiner*—Thai Q. Tran
*Assistant Examiner*—Mishawn Dunn (57) ABSTRACT

A video processing device includes a background audio change detector that detects background audio changes in audio data corresponding to particular video data. The video processing device detects semantically meaningful video scenes using detected background audio changes and delimits segments of the video data.

33 Claims, 8 Drawing Sheets

USING BACKGROUND AUDIO CHANGE DETECTION FOR SEGMENTING VIDEO

FIELD OF THE INVENTION

The present invention relates generally to segmenting and indexing video, and more particularly to segmenting and indexing video into semantically meaningful video scenes.

BACKGROUND OF THE INVENTION

Video devices are any type of device used to capture, store, process or play back video. Video devices generally work with a video captured by some manner of video recording device, such as a video camera. A video recording device may be used to record video of persons, events, scenes, etc. In addition, some video recording devices may be capable of adding effects directly into the video.

Many video processing devices exist that cannot record video but are capable of storing and/or processing it. One example is a video editor device. Home computers, when configured with video processing software, may be able to store and process digital video data, including processing operations such as editing, adding effects, trimming, etc. The processed video may then be electronically transferred to other devices or played back to users. Another type of video processing device is a playback device such as a VCR or a DVD player that displays videos to a user.

Video recording devices have become very popular, especially for home use. As they become cheaper, they have become increasingly widespread. As a result, many non-professional videographers are capturing videos.

Most video tapes contain multiple video scenes. A video scene may be defined as a continuous portion of video having a common subject over a contiguous period of time and in the same or contiguous space. A scene therefore contains a story or at least contains an independent semantic meaning.

Each video scene typically comprises one or more video shots. Each shot is a video segment captured from a record button press to a stop button press, i.e., a shot is a continuous capture period.

Captured video may be processed at a later time. The processing may be performed for various reasons, including imposing some form of organization that is useful for viewing. The processing therefore may include segmenting the video, such as by inserting indexes into the video. The segmenting is done so that particular video scenes or video shots may be easily found. In addition, the segmenting may enable a person to later determine what is stored on a particular tape.

The problem with most video recordings is that they are typically captured to magnetic tape. Magnetic tape is heavily used for video recording because it is widely available and can store large quantities of video. Magnetic tapes are also cheap and easy to use, with one exception. The exception is that videographers end up with many different scenes captured on a single tape, and may accumulate many tapes. Therefore, video segmenting and indexing becomes a large, complicated, and time-consuming task. The same problem exists for other types of storage media as well, such as solid-state memory, memory disc, optical memory, etc.

The prior art has approached the video indexing and segmenting problem in several ways. In a first prior art approach, the photographer (or other user) must manually fast-forward or rewind through a tape in order to find a particular video shot or scene. Moreover, the user may occasionally have to pause to play the tape in order to see if the desired scene has been found. The user may then still need to do additional fast-forwarding or rewinding once the shot or scene has been found in order to find the beginning of the shot or scene. Then the video indexing or segmenting can be performed. This manual searching process may need to be done many times per tape.

The first prior art approach therefore has many drawbacks. Finding a particular video scene may be very difficult and very time consuming. This difficulty will be greater if the user is searching for a shot or scene that is relatively short (i.e., it will be harder to locate the desired video scene by fast-forwarding or rewinding). The problem is compounded when the user must find multiple scenes and therefore must move backwards and forwards many times in a recorded video.

In a second prior art approach, professional video segmenting systems have been developed (such as part of a professional video editing system). However, these prior art video segmenting systems are focused on professionally produced video. They typically feature specialized expensive equipment and operate on recorded audio that is unlike audio data captured within a home video tape. The professional video segmenting systems of the prior art operate on audio that is generally separately captured and tightly controlled during capture, such as in a studio environment. The prior art video segmenting systems typically segment video wherein the audio component has been subjected to processing, such as filtering and noise control, regulation of the captured audio level, etc.

One drawback to the second prior art approach is that such professional video editing/segmenting systems are expensive and are designed for highly processed audio. Furthermore, the prior art professional video approach may not work satisfactorily on home audio that has varying capture levels and large amounts of background noise.

Another drawback is that the segmenting and indexing of the prior art professional approach operates through shot detection. The prior art professional segmenting approach analyzes video frames, separates the video into shots, and extracts one or more frames from each shot to represent it. The prior art video indexing and segmenting therefore cannot segment video into semantically meaningful video scenes, and is only capable of indexing and segmenting individual shots. This kind of indexing lacks semantic meaning because one scene or story may contain many shots, and there is no way to decide what shots are within one story. As a result, there may be too many index frames within a video tape or video file. As a result, the user cannot easily browse and retrieve the video segments.

Therefore, there remains a need in the art for improvements to video segmenting and indexing.

SUMMARY OF THE INVENTION

A video processing device comprises a background audio change detector that detects background audio changes in audio data corresponding to a particular video data. The video processing device detects semantically meaningful video scenes using detected background audio changes and delimits segments of the video data.

DETAILED DESCRIPTION

Figure 1:
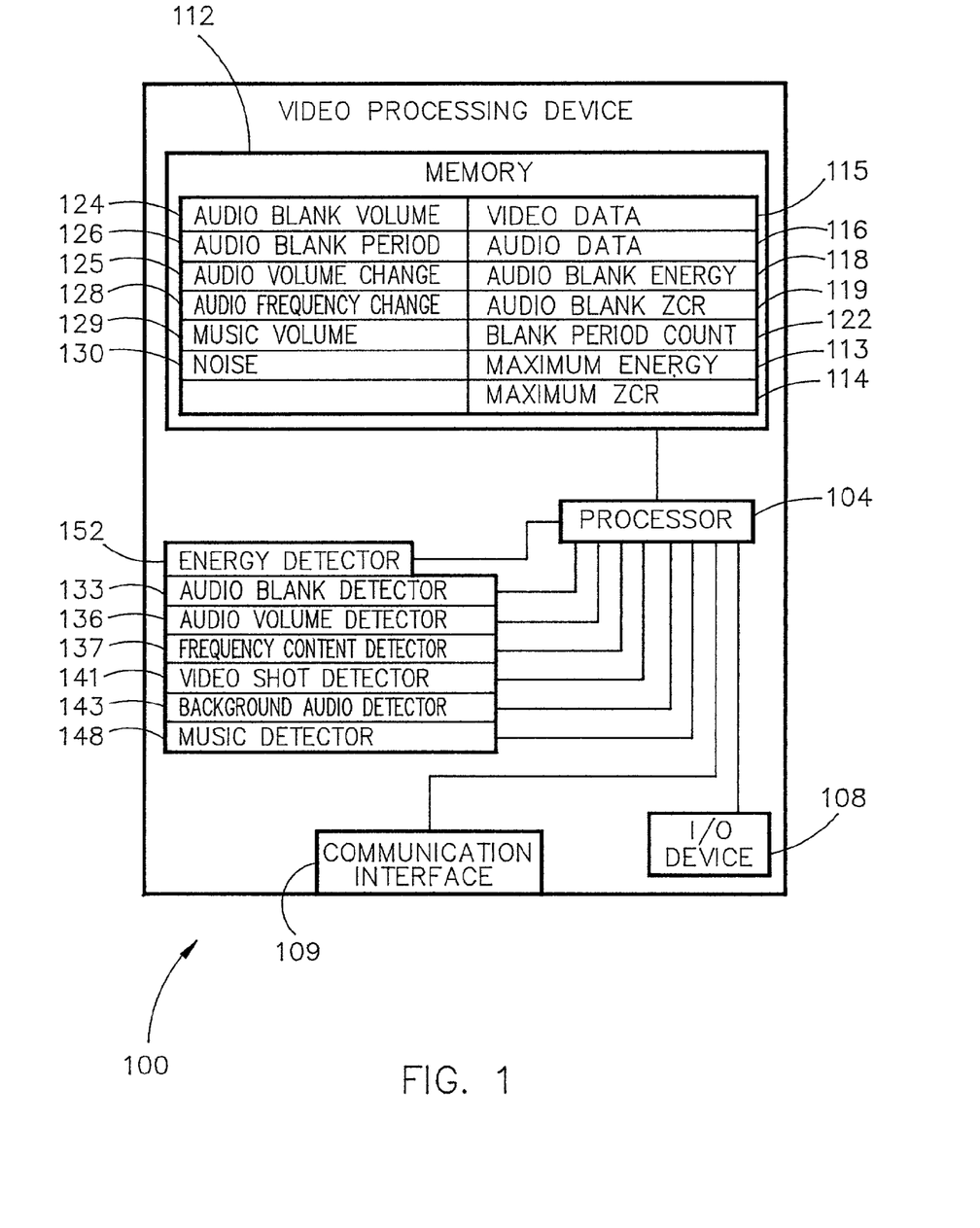
FIG. 1 is a schematic of a video processing device according to one embodiment of the invention.

FIG. 1 is a schematic of a video processing device 100 according to one embodiment of the invention. The video processing device 100 may be any type of electronic device capable of processing video data, including video recorder devices, video editor devices, and combinations thereof. The video processing device 100 therefore may be a digital or analog video camera, a computer configured by video processing software, a dedicated video processing device, a video playback device such as a video cassette recorder (VCR), a digital video disc (DVD) player for writable DVD discs, a home entertainment center, etc.

The video processing device 100 may include a processor 104, at least one input/output (I/O) device 108, a communication interface 109, a memory 112, an audio blank detector 133, an audio volume detector 136, a frequency content detector 137, a video shot detector 141, a background audio detector 143, a music detector 148, and an energy detector 152.

The processor 104 may be any type of general purpose processor. The processor 104 executes a control routine contained in the memory 112. In addition, the processor 104 receives user input and conducts the overall operation of the video processing device 100.

The at least one I/O device 108 may be any type of input and/or output device. The at least one I/O device 108 may include a set of input function buttons (such as on a video camera), a keyboard, a mouse or other pointing device, a display (including CRT or LCD displays), a touch screen, a remote control, etc. The at least one I/O device 108 may be used to accept input commands and make selections from among operations available for the video processing device 100. The at least one I/O device 108 may additionally be used to receive information from the video processing device 100 and view video segments or video frames.

The communication interface 109 may be any type of communication interface, including a universal serial bus (USB) port, a wireless communication transceiver, a network card for a computer network, a modem for digital communication over a telephone line, a FIREWIRE card, etc. The communication interface 109 allows the video processing device 100 to transmit and receive digital data, including digital video data.

The memory 112 may be any type of digital memory. The memory 112 may store, among other things, video data 115, audio data 116, an audio blank volume threshold 124, an audio blank period threshold 126, an audio volume change threshold 125, an audio frequency change threshold 128, a predetermined audio blank energy threshold 118, a predetermined audio blank ZCR threshold 119, a blank period count 122, a predetermined maximum energy threshold 113, a predetermined maximum ZCR threshold 114, a predetermined music volume threshold 129, and a predetermined noise threshold 130. In addition, the memory 112 may store software or firmware to be executed by the processor 104.

The video data 115 is digital video data and may be stored in a random access memory (RAM). Alternatively, the video data 115 may be a storage of the video data in any type of storage medium, such as on a magnetic tape, or may be a copy of video data obtained from a tape or disc storage medium. The video data 115 may be read out of the memory 112 and processed by the video processing device 100.

The audio data 116 is the audio complement of the video data and may be stored in parallel with the video data 115. Alternatively, the audio may be multiplexed with the video data 115, and may require de-multiplexing into video data and audio data before the video segmenting can be performed.

The predetermined audio blank period threshold 126 stores a predetermined minimum time period value of an audio blank. The predetermined audio blank period threshold 126 may be about 10 milliseconds to about 1 second in duration.

The predetermined audio blank volume threshold 124 stores a predetermined audio blank volume threshold value. The predetermined audio blank volume threshold 124 may be an absolute digital amplitude value of about 30 to about 60 for a 16-bit audio sample, wherein the audio amplitude values range from −32,768 to +32,767. It should be understood that this threshold (and others below) may need to be appropriately scaled if the audio sample is not a 16-bit audio sample. Alternatively, the predetermined audio blank volume threshold 124 may be a corresponding energy value.

The audio volume change threshold 125 is a stored audio volume change threshold value. The audio volume change threshold 125 may range from about 5 decibels (db) to about 30 db, for example. If the change in the volume of the background audio exceeds the audio volume change threshold 125, then the processor 104 may determine that there has been a change in the background audio.

The audio frequency change threshold 128 is a stored audio frequency change threshold value. The audio frequency change threshold 128 may range from about 5 db to about 30 db, for example. If the change in the frequency content of the background audio exceeds the audio frequency change threshold 128, then the processor 104 may determine that there has been a change in the background audio.

The predetermined audio blank energy threshold 118 stores an audio blank energy value that is used for detecting an audio blank. The predetermined audio blank energy threshold 118 may be an absolute digital amplitude value that ranges from about 30 to about 60 for a 16-bit audio sample (alternatively, this threshold may be in the form of an energy value).

The predetermined audio blank ZCR threshold 119 stores an audio blank ZCR value which is used for detecting an audio blank. The predetermined audio blank ZCR threshold 119 may range from about 1 to about 2 crossings per 100 audio samples.

The blank period count 122 stores a count of audio frames in which the audio blank volume is less than the predetermined audio blank volume threshold 124. The blank period count 122 therefore may be used to detect an audio blank when it is compared to the predetermined audio blank period threshold 126.

The predetermined maximum energy threshold 113 stores an energy value which is used for detecting an audio blank. The predetermined maximum energy threshold 113 may be an absolute digital amplitude value that ranges from about 100 to about 300 for a 16-bit audio sample (alternatively, this threshold may be in the form of an energy value).

The predetermined maximum ZCR threshold 114 stores a ZCR value which is used for detecting an audio blank. The predetermined maximum ZCR threshold 114 may range from about 5 to about 10 crossings per 100 audio samples.

The predetermined music volume threshold 129 stores a minimum music volume, below which music cannot be reliably detected. The predetermined music volume threshold 129 may be an absolute digital amplitude that ranges from about 1000 to about 2000 for a 16-bit audio sample (alternatively, this threshold may be in the form of an energy value).

The predetermined noise threshold 130 stores a minimum signal-to-noise ratio. The predetermined noise threshold 130 may range from about 3 db to about 10 db. When the signal-to-noise ratio is above the predetermined noise threshold 130, the music is likely to be foreground music; otherwise it is likely to be background music.

In operation, the processor 104 receives the video data and the audio data. The video and audio data may be derived from a common source, such as a magnetic video tape. Therefore, the video processing device 100 may need to de-multiplex the video and audio. Alternatively, they may be separately received in a concurrent manner.

The input to the system may be a video from a video recorder, with the video being processed in real-time, according to the invention. The video may therefore be a video stream obtained from a video recorder, such as a video camera, for example. The video stream may be processed and delimited and segmented as it is received. The video stream may be received through any manner of communication device, such as the communication interface 109, for example. Alternatively, the video may be already recorded to some form of storage medium, and may therefore be obtained from the storage medium and delimited and segmented.

The processor 104 processes the audio and determines if the audio data is a foreground audio or a background audio, such as by using the background audio detector 143. The background audio detector 143 may apply a speech detection algorithm or a music detection algorithm to the audio data, in addition to an audio energy measurement. If the audio data does not contain speech or music above a predetermined energy threshold, then the background audio detector 143 determines that the audio data is background audio. The foreground/background audio determination may be performed in any manner, and may be based on a presence of speech or music. One embodiment of background audio detection is discussed in the co-pending patent application Ser. No. 10/020,256 to the same inventor, and is incorporated herein by reference.

The processor 104 then detects background audio changes by detecting a blank spot in the background audio, by detecting a volume change in the background audio, by detecting a frequency change in the background audio, or by detecting stable frequency peaks in music. In addition, combinations of the above methods may be employed.

The background audio changes may be used to segment and/or index the video data. The objective of the invention is to segment the video data into semantically meaningful scenes so that each scene can be accessed and indexed independently. Different scenes are generally recorded at different times and at different settings. Such video segmenting and indexing will greatly aid in browsing, editing and playing back a captured video.

In a first background audio change detection embodiment, the audio blank detector 133 senses blank spots in the audio data. The blank spots occur when the audio volume is less than the predetermined audio blank volume threshold 124 for a time longer than the predetermined audio blank period threshold 126, as previously discussed. It should be noted that although the audio blank detector 133 is shown as a hardware block, it could alternatively be implemented in a digital software processing routine. Moreover, the audio blank detector 133 may be implemented as part of the audio volume detector 136.

The invention may detect an audio blank in more than one way. In one audio blank detection embodiment, the short-time energy function E(n) (i.e., the average energy of a single audio frame) for the audio is computed and used. The short-time energy function E(n) is defined as:

$$E_n = (1/N)\sum_m [x(m)w(n-m)]^2 \qquad (1)$$

where x(m) is the discrete time (digitized) audio sample, m is the time index of the audio sample, n is the time index of the short-time energy, and w(m) is a rectangular window defined by:

$$w(m) = 1 \qquad 0 <= m <= N-1$$
$$\phantom{w(m) =\ } 0 \qquad \text{otherwise}$$

where N is the length of the rectangular sampling window.

Such a sampling window provides a convenient representation of the volume variation over time. By assuming that the audio signal changes relatively slowly within a small interval, $E_n$ may be computed about every 10 to 20 milliseconds. For example, if the sampling rate used to capture and digitize the audio data was a sampling rate of 8000 Hz, the energy function $E_n$ may be computed about every 100 audio samples. The window length N is usually set to be larger than the $E_n$ computation occurrence interval so that there is an overlap between neighboring audio frames. For example, if $E_n$ is computed every 100 samples, the window length may be set at 150 samples.

In another audio blank detection embodiment, the short-time average zero-crossing rate Z(n) for the audio is used. In the context of discrete time (digitized) audio, a zero-crossing is said to occur if successive samples have different signs. The zero-crossing rate therefore is a simple measure of the frequency content of a signal. The short-time average ZCR is defined as:

$$Z_n = (1/2)\sum_m \{[sgn[x(m)] - sgn[x(m-1)]]\}w(n-m) \qquad (2)$$

where:

$$sgn[x(m)] = 1 \qquad x(m) >= 0$$
$$\phantom{sgn[x(m)] =\ } -1 \qquad x(m) < 0$$

and $$w(m) = \begin{cases} 1 & 0 <= n <= N-1 \\ 0 & \text{otherwise} \end{cases}$$

Again, N is the length of the rectangular window w(m). As is done for the energy function, $Z_n$ is likewise computed about every 10 to 20 milliseconds and the length of the window is set to be larger than the $Z_n$ computation occurrence interval so that there is an overlap between neighboring audio frames.

The sampling window used for deriving the short-time energy function E(n) (and ZCR Z(n)) may be relatively short, such as about 10 to 20 milliseconds in length, for example. Overlapping windows are used for computing these short-time audio features. The overlapping windows are shorter than most speech phonemes and musical notes, so that audio features are relatively stable within the windows. Therefore, the windows may be overlapped so that the computed audio features are continuous.

In operation, both E(n) and Z(n) are calculated at each computation occurrence interval, and the E(n) and Z(n) values are compared to the predetermined audio blank energy threshold 118 and to the predetermined audio blank ZCR threshold 119, respectively. An audio blank may be detected if either or both are less than a corresponding threshold. Therefore, although silence in audio may be detected using an energy comparison alone, the audio blank detection using both is more accurate. Additionally, the E(n) and Z(n) values may be range checked by comparison to the predetermined maximum energy threshold 113 and to the predetermined maximum ZCR threshold 114, respectively.

In one scenario, both E(n) and Z(n) are below the predetermined audio blank thresholds. This is a certain audio blank situation. In another scenario, only one of the two is below its corresponding audio blank threshold. In this scenario, the two maximum thresholds are used to determine if an audio blank is present. If both E(n) and Z(n) are below their respective maximum thresholds, then an audio blank is still present. However, if one or both are above their respective maximum thresholds, then an audio blank is not present.

If either of the E(n) or Z(n) values are below their respective threshold, a count is added to the blank period count 122 (conversely, the blank period count 122 is reset if the threshold is exceeded). The time duration of the audio low volume therefore may be determined by counting the number of audio samples. Since the audio sampling rate is generally known from the header of the audio file (i.e., standard digital video typically includes audio sampled at rates of 8,000, 11,025, 22,050, 44,100, or 48,000 Hz), the length of the audio volume blank may be easily tabulated. If the blank period exceeds the predetermined audio blank period threshold 126, then an audio blank has occurred. The chronological position of the audio blank may be recorded for the segmentation and indexing processes.

In a second background audio change detection embodiment, the audio volume detector 136 detects the volume of the audio. The audio volume may be used to detect a change in the background audio. It should be noted that although the audio volume detector 136 is shown as a hardware block, it could alternatively be implemented as a digital software processing routine. The processor 104 may receive two audio volume measurements from the audio volume detector 136 in the form of two average short-time energy function E(n) calculations. The short-time energy functions E(n) are computed in two sliding windows Win1 and Win2 from portions of the audio data.

Figure 2:
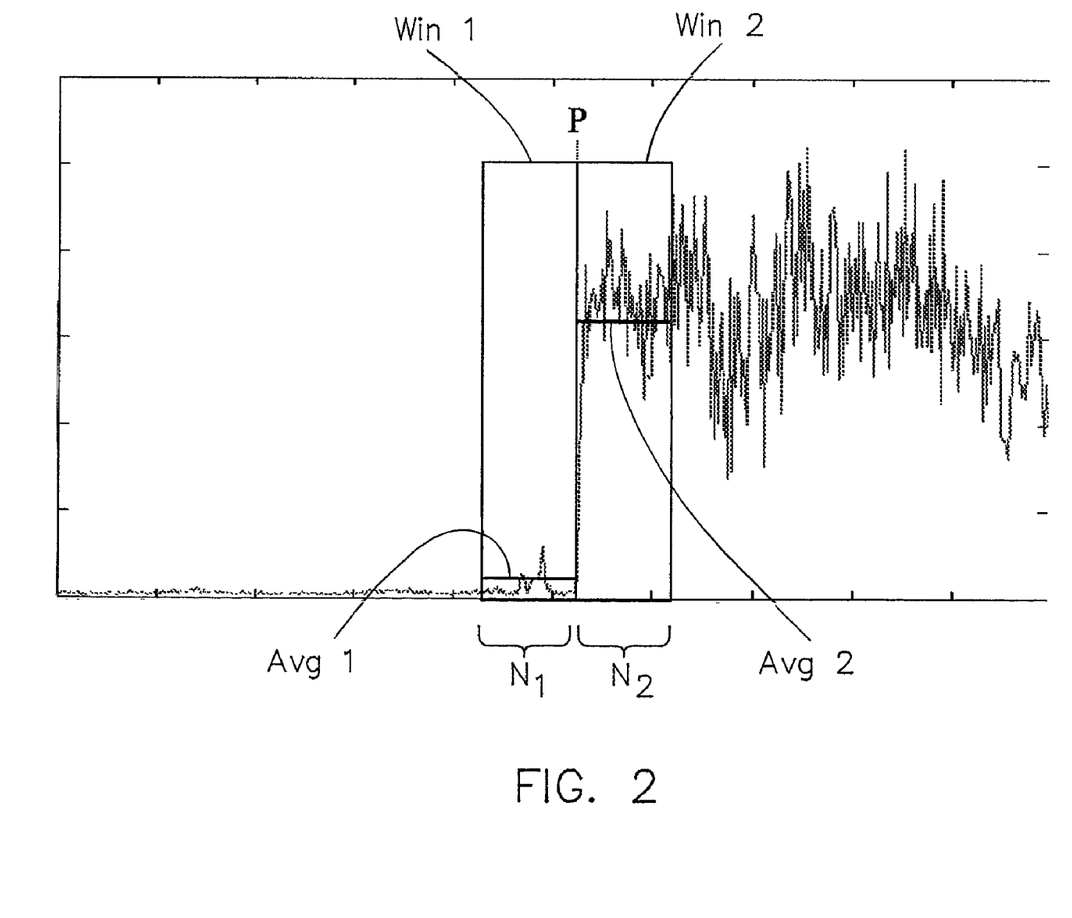
FIG. 2 shows two sampling windows Win1 and Win2.

FIG. 2 shows the two sampling windows Win1 and Win2. The x-axis is the time index n used in the energy function E(n) and the y-axis is the amplitude of E(n) (i.e., the value of E(n)). The two sliding windows are positioned next to each other. The windows Win1 and Win2 are of a predetermined length (and are preferably the same length). The two windows are moved simultaneously. When each window is complete, the average values Avg1 and Avg2 for the two windows are computed.

The windows Win1 and Win2 are relatively long, such as about 1 or 2 seconds in length, for example. Longer sliding windows may be used to measure long-term changes in the audio features. By using a window that is relatively long with respect to speech phonemes or music notes, and by using overlapping windows, the audio data may be sampled in a way that eliminates the possibility of flagging an audio event as a background change if the audio event is part of speech, music, etc. Consequently, the sliding window operates to ignore or average out transient changes in the audio data, and the result is a comparison of the audio data over a large portion of time. This increases the reliability of the audio background change determination.

The values Avg1 and Avg2 are average values of E(n) for the windows Win1 and Win2, respectively. Whenever the difference between Avg1 and Avg2 exceeds the predetermined audio volume change threshold 125, a sudden change in the audio volume is detected and the processor 104 determines that a background audio change has occurred. The position of the change (for purposes of segmenting and indexing) is the edge between the two windows (i.e., the point P in the figure).

In a third background audio change detection embodiment, the frequency content detector 137 measures the frequency content. Frequency content refers to audio features present in the frequency domain. The frequency content detector 137 may implement a fast Fourier transform (FFT), for example. The frequency content may be used to detect a change in the background audio. Although the frequency content detector 137 is shown as a hardware block, it could alternatively be implemented in a digital software processing routine.

In order to compute the frequency energy distribution of audio, the short-time spectrum of audio data (i.e., the spectrum of a single audio frame) is computed. The computation is performed after first segmenting the audio into overlapping frames of predetermined length (such as 100 to 500 milliseconds long, for example). A frequency spectrum of each frame is then computed. There are different ways of computing such a frequency spectrum, such as a fast Fourier transform (FFT), for example. Alternatively, other direct or indirect methods may be used. The number of FFT sample points (N) may be chosen (e.g., N may be 512 points, 1024 points, etc.), depending on the desired resolution and processing time. As a result, the frequency axis of the spectrum may be divided into M bands and the energy in each band is computed (i.e., compute $E_i(n)$, where i=1 to M). For example, M may typically range between 3 and 6, although other values may be selected for M. Note that the frequency content detection may operate on just one frequency band, several frequency bands, or all frequency bands. The ratio of the energy in each band $E_i(n)$ to the total energy $R_i$ (i.e., the sum of all $E_i(n)$ values) is computed by:

$$R_i = E_i \bigg/ \sum_{i=1}^{M} E_i \qquad (3)$$

A pair of sliding windows is then used to detect sudden changes in $E_i$ and $R_i$ (see FIG. 2 above and accompanying text). To do this, average values of $E_i$ and $R_i$ are computed for audio frames within each window. Whenever the difference between the two windows Win1 and Win2 exceeds the predetermined audio frequency change threshold 128, a change in the frequency content is detected and a background audio change therefore is detected.

In a fourth background audio change detection embodiment, the music detector 148 detects music in the audio data by detecting substantially stable frequency peaks in an audio spectrogram. Frequency peaks in the whole frequency range or in a predetermined frequency range may be checked. For example, in order to avoid the influence of low-frequency noise, the frequency range may be chosen so that only peaks above a certain frequency value (i.e., a value between 500 to 1000 Hz) are checked. First, the energy E(n) of the audio data is computed, as previously described. The energy E(n) is compared to the predetermined music volume threshold 129. This is done because audio frames with low energy are unlikely to contain music. Then spectrograms are computed for all audio frames that passed the energy check (a spectrogram is composed of the spectrums of consecutive audio frames). The spectrogram is then checked for stable frequency peaks that indicate music components (i.e., strong frequency values in a spectrogram must repetitively occur, see FIG. 3 below).

Figure 3:
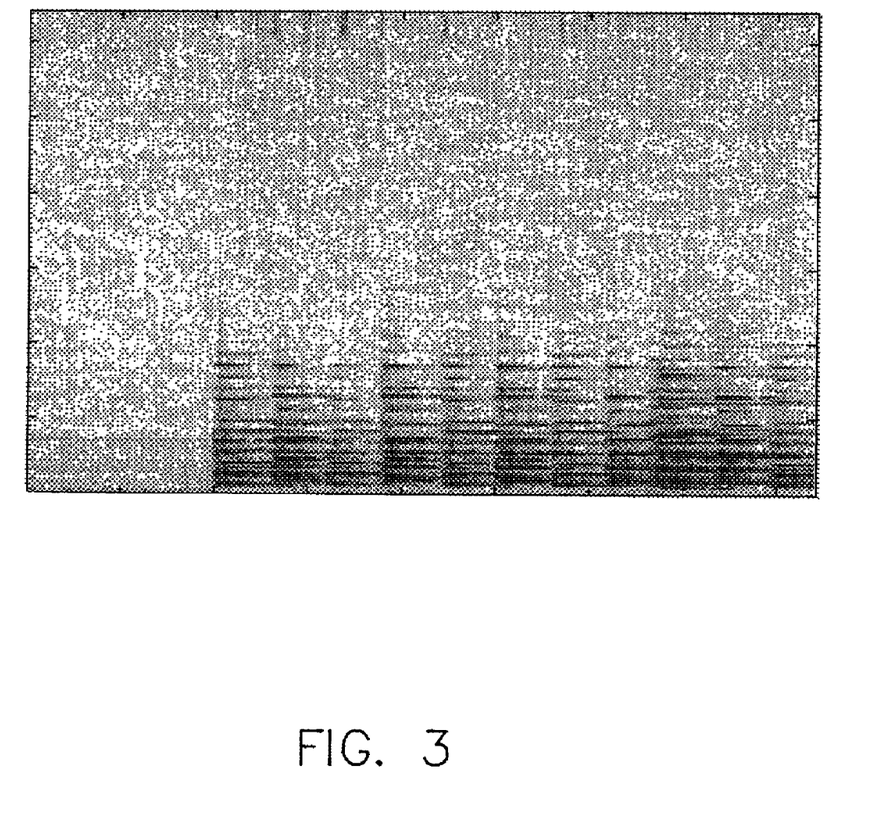
FIG. 3 is a spectrogram of captured music.

FIG. 3 is a spectrogram of captured music. The spectrogram contains sound from a piano. From this figure the temporal range and harmonic partials of each note can be seen (there are 11 notes total). The harmonic partials are stable peaks at certain frequencies during the duration of a music note, and are seen in the figure as dark, horizontal line segments.

Stable frequency peaks therefore may be found through use of a pattern matching algorithm that finds peaks over a time period of about 150 to about 500 milliseconds. If music is detected, the average volume and noise level are compared to the predetermined music volume threshold 129 and the predetermined noise threshold 130 (i.e., the signal-to-noise ratio of the music is checked). If the music volume is higher than the predetermined music volume threshold 129 and if the music signal-to-noise ratio is lower than the predetermined noise threshold 130, the audio comprises background music. The points where the music suddenly starts or stops (instead of a gradual start or stop) are found by checking for a change in volume.

Figure 4:
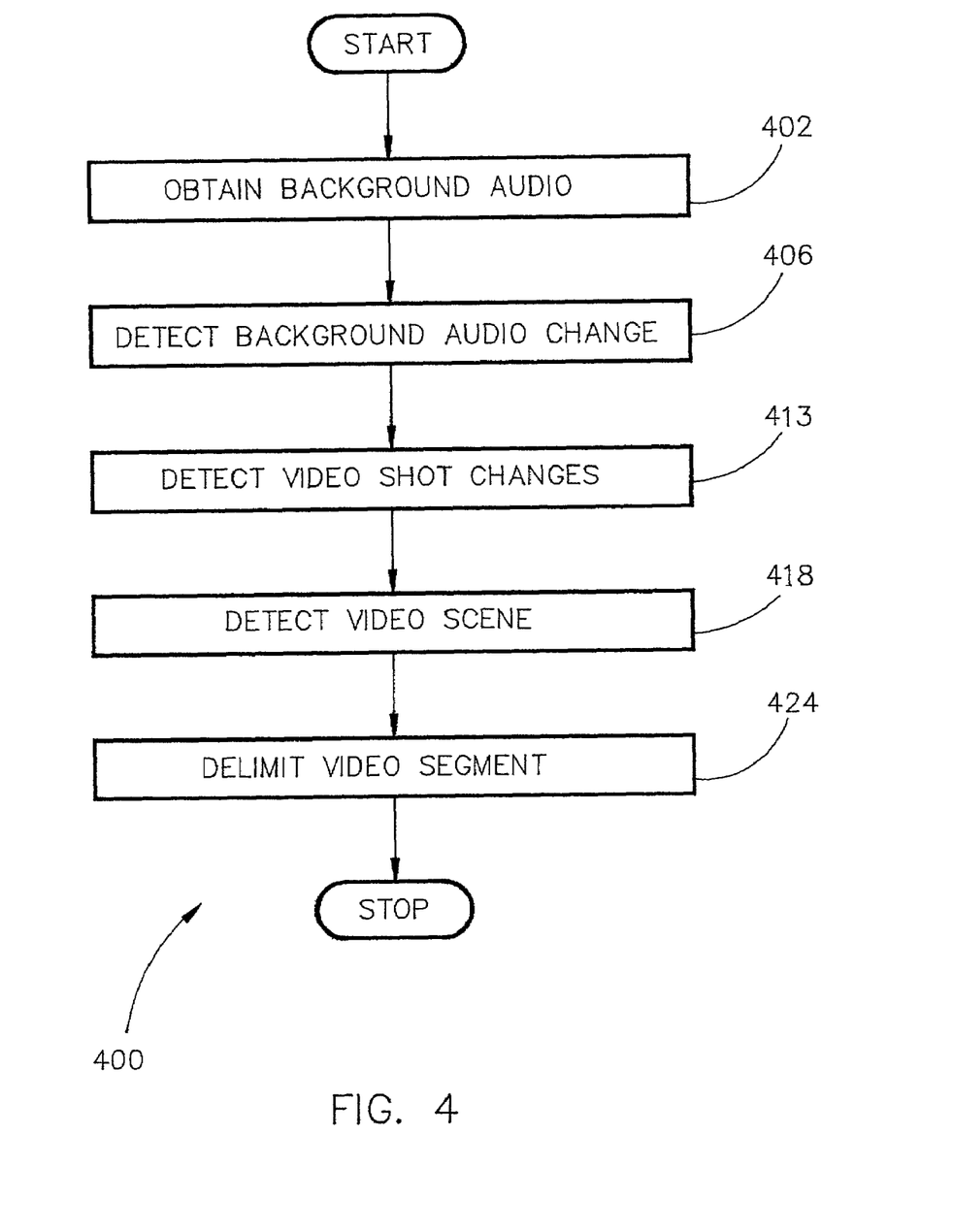
FIG. 4 is a flowchart of a method of segmenting video data.

FIG. 4 is a flowchart 400 of a method of segmenting video data. In step 402, the background audio is obtained. This may include de-multiplexing a video stream to produce video data and audio data. In addition, this may include determining whether the audio data comprises a foreground audio or a background audio, as previously discussed.

In step 406, a background audio change is detected. The background audio change may be detected by detecting a blank spot in the background audio, by detecting a volume change in the background audio, by detecting a frequency change in the background audio, or by detecting stable frequency peaks in music, as previously discussed. In addition, combinations of the above methods may be employed.

The various types of background audio change detection described above may be iteratively performed in order to segment an entire video. In addition, the various types of background audio change detection may be performed in combination to increase the reliability of the background change detection. The method may therefore segment video data into a series of semantically meaningful video scenes.

An additional part of the detection may include detection of transients in the audio, i.e., clicks or pops. Since scene changes are associated with background audio changes, such transients may be first detected so that they will not interfere with the detection of background changes. Clicks or pops may be detected by their volume and duration, as they are essentially sharp spikes which are high in volume but short in duration.

It should be pointed out that there is a difference between foreground speech (loud and clear speech) and background talk (such as a group of people talking at a party, or low, unclear talk merged into background noise, for example). There is also a difference between foreground music (i.e., music as major content of the video, such as in concert video) and background music (i.e., music is played in the scene as background, such as at a party). Foreground music contains a higher volume level, but with a relatively low noise level. Consequently, most music in home video is background music.

In step 413, video shot changes may optionally be detected. The video shot changes may be detected by analyzing video frame differences, as is known in the art, and may provide additional information when segmenting the video data. This additional information may be helpful because an audio change may happen within a shot, e.g., music may start or stop in the middle of a shot. By combining background audio information with shot change information, the video processing device 100 may be able to ignore background audio changes that are not scene changes.

In step 418, a video scene in the video data is detected. The video scene may be detected using the detected audio background change or using the detected audio background change in conjunction with the detected video shot changes.

Shot changes and background audio changes are detected in the video data and the audio data, respectively. When a shot change and a background audio change occur substantially simultaneously, a scene change is defined. The precise location of the scene change is at the video frame where the shot change occurs.

In step 424, a video segment corresponding to the semantically meaningful video scene is delimited. This may be done in various ways. In a first embodiment, the delimiting may be done by saving or writing segmented video scenes into separate storage locations in a storage medium. For example, each segmented video scene may be written to a separate file on a DVD disc. This separation may be beneficial in that the user can easily find scenes and may use, re-use, or delete scenes.

In an alternative embodiment, the delimiting is performed by inserting index data into the video data at the beginning of each semantically meaningful video scene, in order to make the scene easy to find. Alternatively, this may comprise saving a set of pointers, where each pointer value is an address of a first video frame of a video scene. Through such an index or pointer, the user may be able to go to the beginning of a particular scene or to scan from scene to scene until the user finds the desired scene. The user therefore may browse the video data by going from scene to scene.

Alternatively, the delimiting operation may comprise extracting one or more representative video frames from each video segment or scene. The user may browse through a collection of such representative video frames in order to find a desired video scene. The first video frame may also operate as an index and may take the user to the beginning of the corresponding scene, if it is selected. For example, the extracted index frames may include a link to corresponding positions in the video data or storage medium (such as a pointer address). Such a link may allow a user to select a particular index video frame and go directly to that video frame in the video data.

There are various ways of extracting index frames from a video scene. For example, one or more frames can be selected from a scene. The first frame may be selected or a middle or last frame may be selected. Alternatively, the video processing device 100 may choose frames at predetermined time periods. In another alternative embodiment, the video processing device 100 may choose index frames in an intelligent way, i.e., it may choose the most proper frames to best represent content of the scene by using predetermined index selection rules or algorithms. Alternatively, the user may interact with the video processing device 100 in choosing representative video frames.

In another alternative, the delimiting operation may include a recordation of a time stamp or similar counter value corresponding to the beginning of each video scene. Each video data may then be modified with a library of such segmenting/indexing time stamps.

Figure 5:
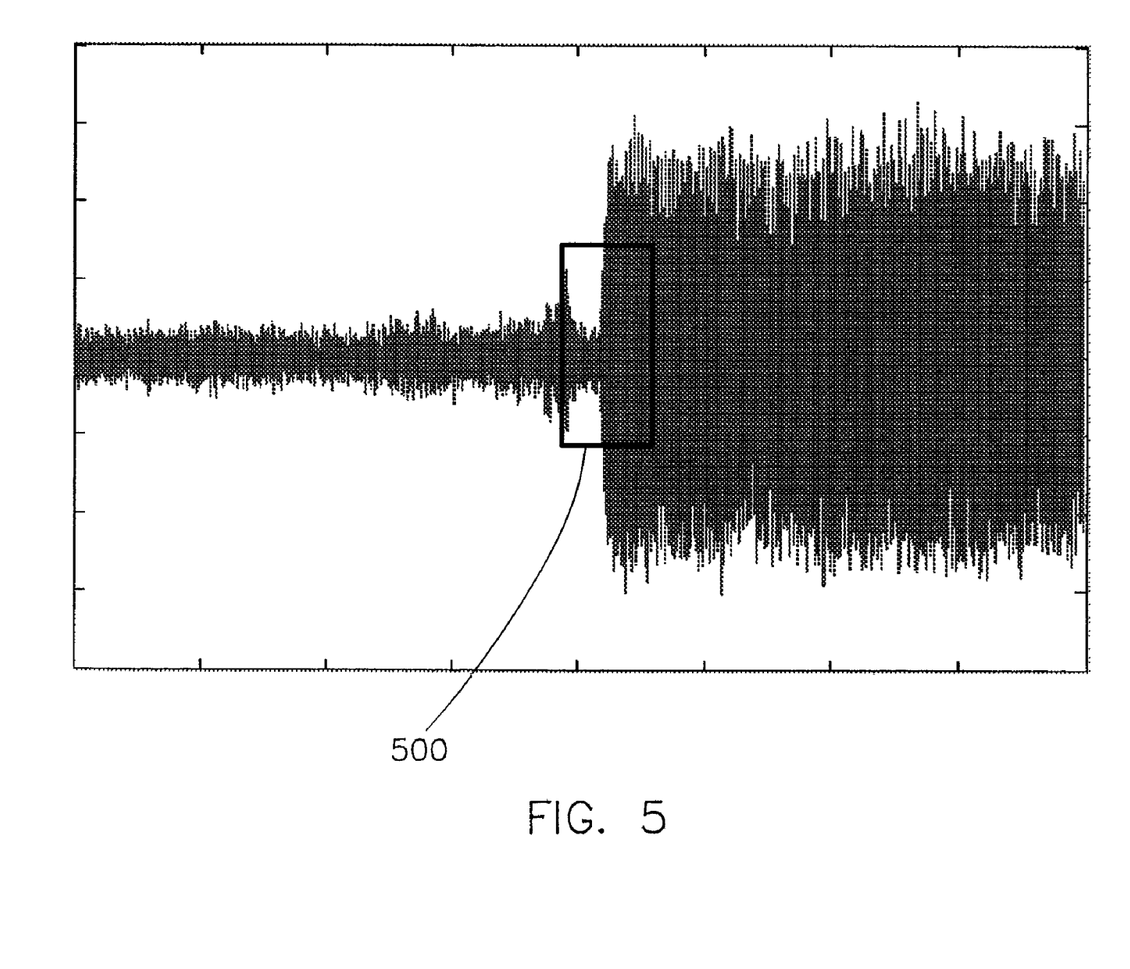
FIG. 5 is a time-domain waveform graph of captured audio data.

FIG. 5 is a time-domain waveform graph of captured audio data. The horizontal axis represents time and the vertical axis represents the amplitude of the audio. The box 500 in the graph indicates a scene change in the middle region of the audio. The scene preceding the box 500 was a scene of family members sitting in a family room, and the scene following the box 500 was an outdoor scene of water skiing. It should be noted there is an abrupt change in audio volume at the scene change. This sudden change in audio volume therefore indicates a scene change in the video data.

Figure 6:
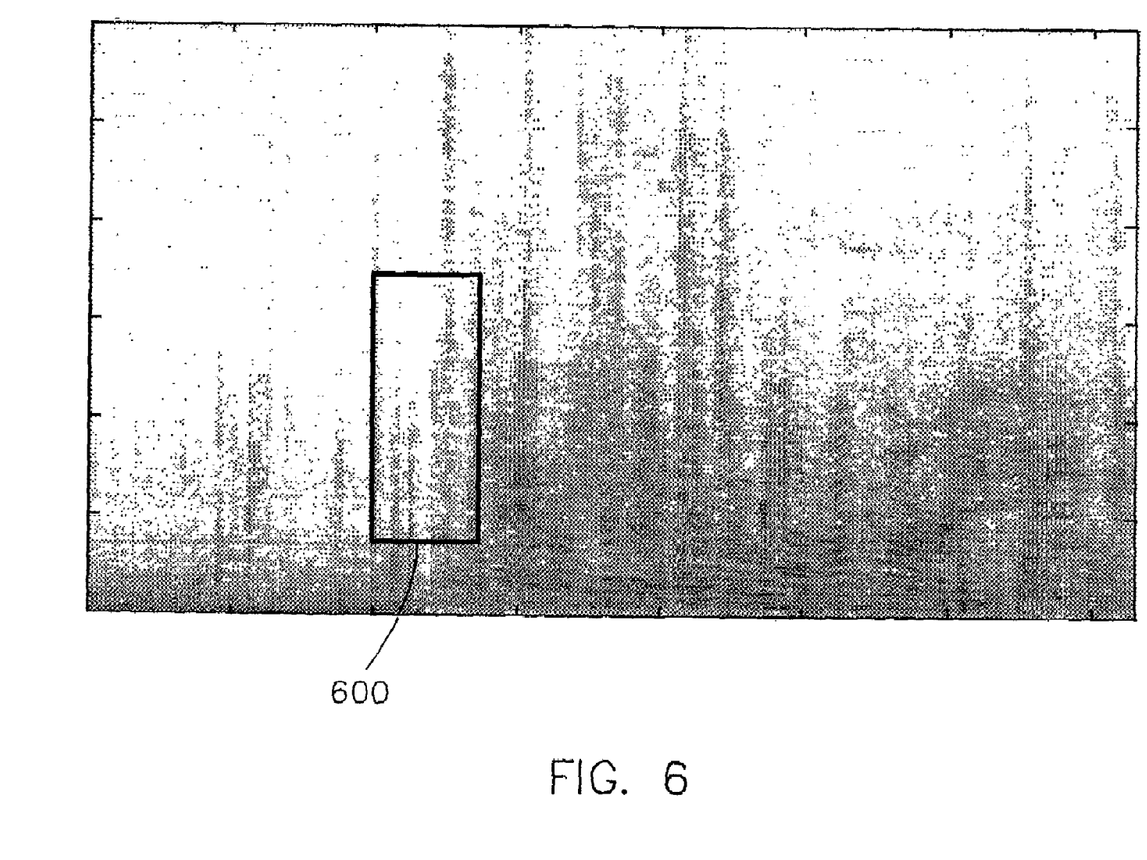
FIG. 6 is a spectrogram of another captured audio data.

FIG. 6 is a spectrogram (i.e., a frequency plot) of another captured audio data, wherein frequency components of the audio are represented by pixel intensities. The horizontal axis again denotes time and the vertical axis denotes frequency. Therefore, for any given point in time, the spectrogram shows all frequency components present in an instant of the audio.

The frequency components in the spectrogram may be determined by inspecting a vertical line originating at the desired point in the horizontal (time) axis. Low frequency components will be shown as dark points at the bottom region of this vertical line. High frequency components are seen as dark points at the top region of the vertical line. White points indicate no frequency component for that frequency at the designated moment in time. Darker pixel elements of the spectrogram reflect a greater frequency content at that point.

A scene change is indicated by the box 600 in the middle of the spectrogram. The scene preceding the box 600 was an outdoor funeral and the scene following the box 600 was an indoor banquet. From the spectrogram, it can be seen that there is a change in frequency content (i.e., the frequency energy distribution) of the audio at the time of the video scene change. While the background audio in the scene preceding the box 600 is dominated by low frequency components, the audio in the scene following the box 600 has significant components in the low and mid-frequency ranges due to the sounds of dishes and a crowd of people talking.

Figure 7:
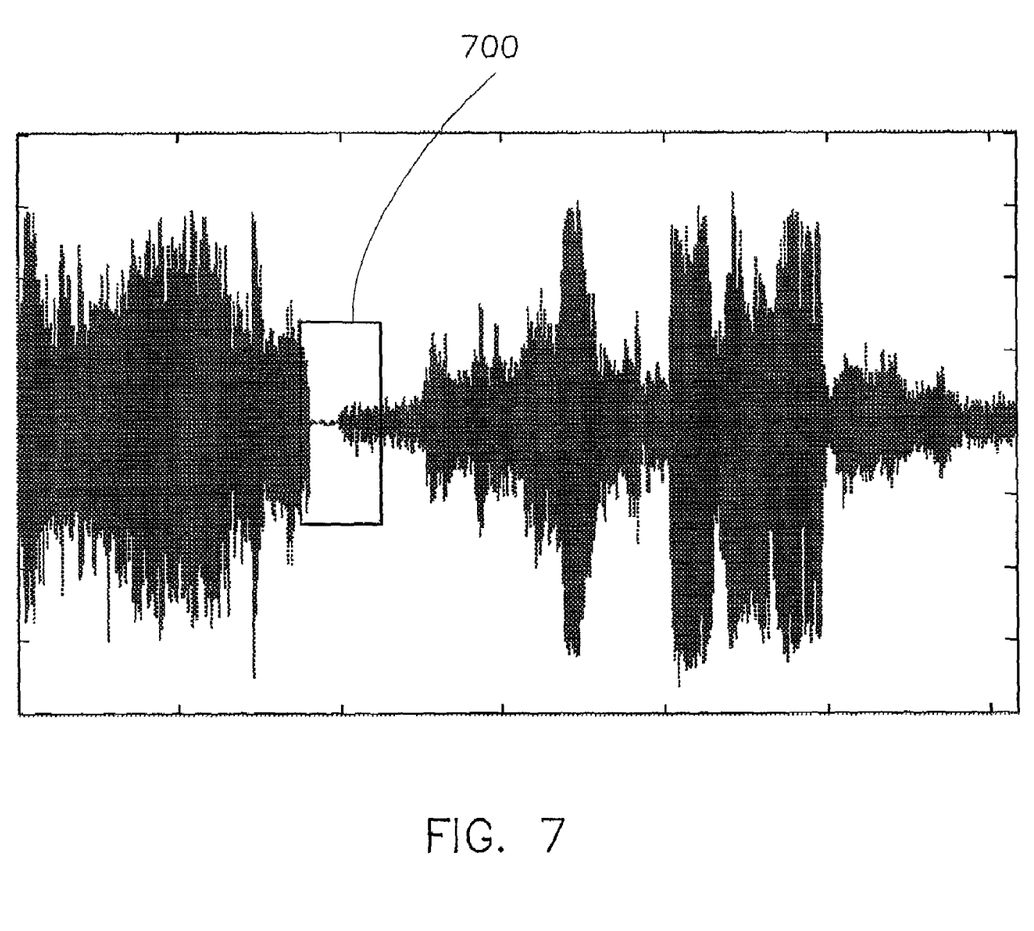
FIG. 7 is another audio waveform graph, showing the audio amplitude.

FIG. 7 is another time-domain audio waveform graph, showing the audio amplitude. The box 700 indicates a short audio blank period and a video scene change in the video data.

Figure 8:
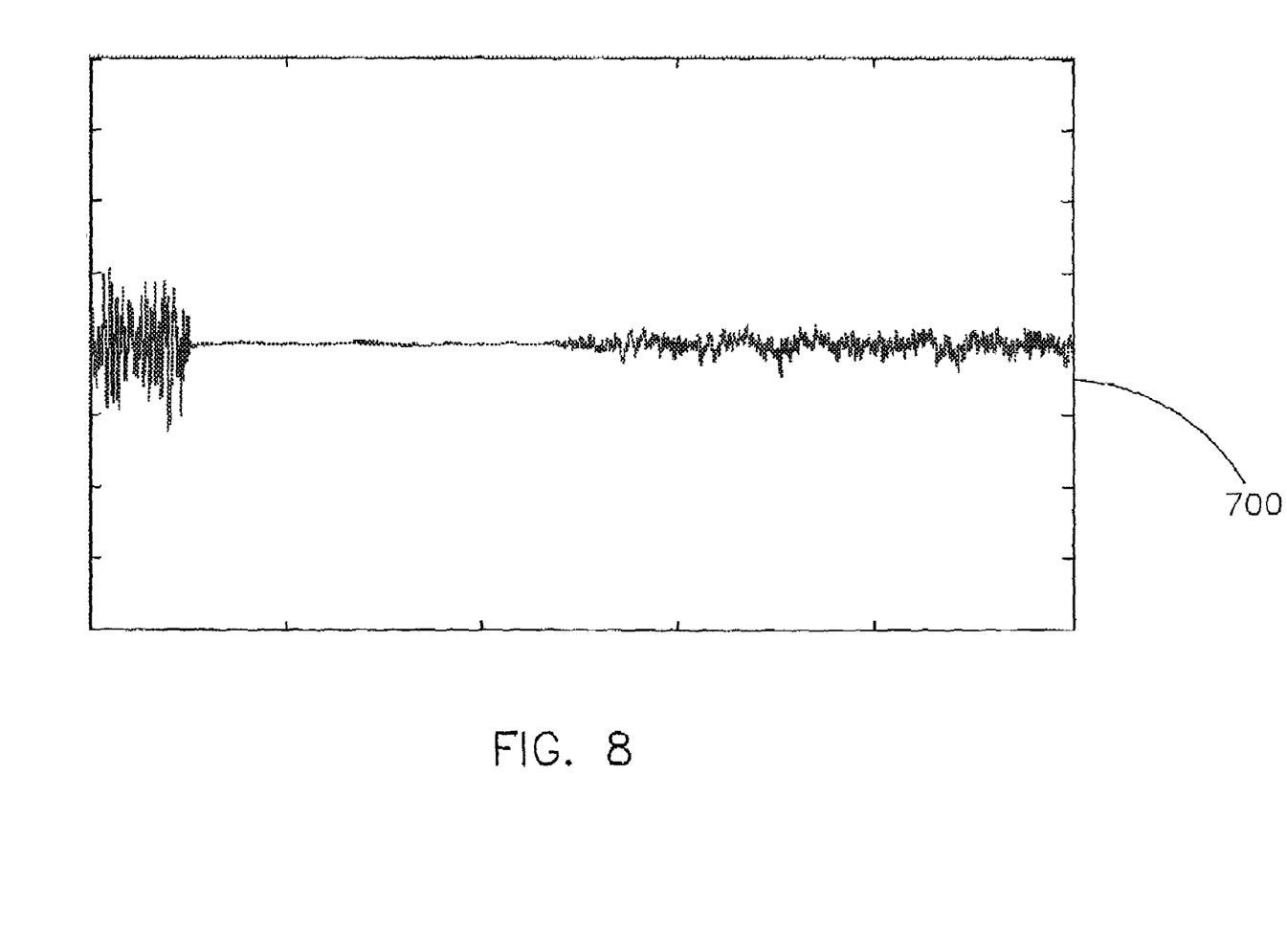
FIG. 8 is a close-up of the audio waveform graph of FIG. 7.

FIG. 8 is a close-up of the audio waveform graph of FIG. 7, i.e., it shows just the waveform of the box 700. The blank period can be clearly observed at the scene change. The audio wave volume during this blank period remains near zero and remains there for a significant time period. Therefore, the audio blank may delimit video scenes.

Video segmenting according to the invention may be applied to any video processing device. Therefore, the video processing device 100 may be any type of electronic device capable of processing video data, including video recorder devices, video editor devices, video authoring devices, and combinations thereof. The video segmenting according to the invention is especially applicable to any video processing device that uses magnetic tape video storage, although it may be employed in devices having solid-state memory, memory disc, writable optical memory, etc.

The present invention provides several benefits. It makes video browsing and editing fast and easy. Video segmenting according to the invention does not require expensive video processing equipment. Moreover, the invention may be used to create video indexes and representative frames for each semantically meaningful scene in a video.

The invention differs from the prior art in that the invention detects and delimits semantically meaningful video scenes. The invention does not work solely on the basis of shot detection, and detects background audio changes in order to detect the semantically meaningful scenes. Moreover, the video segmenting and indexing according to the invention may be used to segment home video, which may be noisy and irregular.

I claim:

1. A video processing device, comprising:
a background audio change detecting means for detecting background audio changes in video data; and
a memory communicating with said background audio change detecting means and storing said video data and audio data corresponding to said video data, wherein said memory stores a predetermined audio blank volume threshold and a predetermined audio blank period threshold;
wherein said background audio change detecting means detects a background audio change in said audio data by generating an audio blank volume value and detecting an audio blank when said audio blank volume value is less than said predetermined audio blank volume threshold for at least said predetermined audio blank period threshold to detect semantically meaningful video scenes using the detected background audio change.

2. The device of claim 1, wherein said background audio change detecting means further delimits segments of said video data.

3. The device of claim 1, wherein said background audio change detecting means further determines if said audio data comprises background audio.

4. The device of claim 1 wherein said background audio change comprises an audio blank.

5. The device of claim 1, wherein said background audio change comprises an audio volume change.

6. The device of claim 1, wherein said background audio change comprises an audio frequency content change.

7. The device of claim 1, wherein said background audio change comprises a start or stop of music.

8. The device of claim 1, wherein said video processing device comprises a video recorder device.

9. The device of claim 1, wherein said video processing device comprises a video editor device.

10. The device of claim 1, wherein said video processing device comprises a video authoring device.

11. A video processing device, comprising:
a processor;
a background audio change detector communicating with said processor, wherein said background audio change detector comprises a music detector; and
a memory communicating with said processor, said memory storing video data and audio data corresponding to said video data, and wherein said memory stores a predetermined noise threshold and a predetermined music volume threshold;
wherein said background audio change detector detects a background audio change in said audio data by using said music detector to detect substantially stable frequency peaks in said audio data to detect music if a music volume is lower than said predetermined noise threshold and exceeds said predetermined music volume threshold, and wherein said processor detects semantically meaningful video scenes using the detected background audio change and delimits segments of said video data.

12. The device of claim 11, wherein said memory stores a predetermined audio volume change threshold and wherein said background audio change detector comprises an audio volume detector, and wherein said audio volume detector generates an audio volume change value and detects a background audio change when said audio volume change value exceeds said predetermined audio volume change threshold.

13. The device of claim 11, wherein said memory stores a predetermined audio frequency change threshold and wherein said background audio change detector comprises a frequency change detector, and wherein said frequency change detector generates a frequency change value and detects a background audio change when said frequency change value exceeds said predetermined audio frequency change threshold.

14. The device of claim 11, wherein said memory stores a predetermined audio blank volume threshold and a predetermined audio blank period threshold and wherein said background audio change detector comprises an audio blank detector, and wherein said audio blank detector generates an audio blank volume value and detects an audio blank when said audio blank volume value is less than said predetermined audio blank volume threshold for at least said predetermined audio blank period threshold.

15. The device of claim 11, wherein said video processing device comprises a video recorder device.

16. The device of claim 11, wherein said video processing device comprises a video editor device.

17. The device of claim 11, wherein said video processing device comprises a video authoring device.

18. The device of claim 11, wherein said memory further stores a music detection routine, and wherein said processor uses said music detection routine to determine that said audio component is background audio if music of a predetermined signal-to-noise level is not detected.

19. A video processing device comprising:
a processor;
a background audio change detector communicating with said processor, and
a memory communicating with said processor, said memory storing video data and audio data corresponding to said video data, wherein said memory further stores a speech detection routine, wherein said background audio change detector detects a background audio change in said audio data, and wherein said processor uses said speech detection routine to determine that said audio component is background audio if speech of a predetermined energy level is not detected and to detect semantically meaningful video scenes using the detected background audio change and delimit segments of said video data.

20. A method of segmenting video data, comprising the steps of:
detecting background audio changes in background audio data corresponding to said video data by detecting an audio volume that is less than a predetermined audio blank volume threshold for at least a predetermined audio blank period threshold; and
detecting semantically meaningful video scenes using detected background audio changes.

21. The method of claim 20, further comprising the preliminary step of determining whether audio data of said video data is said background audio.

22. The method of claim 20, with the step of detecting background audio changes further comprising detecting an audio volume change in said background audio in excess of a predetermined audio volume change threshold.

23. The method of claim 20, with the step of detecting background audio changes further comprising detecting a frequency change in said background audio in excess of a predetermined audio frequency change threshold.

24. The method of claim 20, with the step of detecting background audio changes further comprising the steps of:
generating a frequency data from said audio data;
detecting substantially stable frequency peaks in said frequency data; and
detecting a background audio change at a start or stop of said substantially stable frequency peaks.

25. The method of claim 20, further comprising the step of delimiting video segments corresponding to said semantically meaningful video scenes.

26. The method of claim 20, further comprising the step of delimiting video segments corresponding to said semantically meaningful video scenes by inserting indexes into said video data at a beginning of said semantically meaningful video scenes.

27. The method of claim 20, further comprising the step of delimiting video segments corresponding to said semantically meaningful video scenes by extracting and storing one or more representative video frames from each video segment.

28. A method of segmenting video data, comprising the steps of:
determining whether audio data corresponding to said video data is background audio;
sampling said audio data if said audio data is said background audio;
detecting background audio changes in said audio data by detecting an audio volume that is less than a predetermined audio blank volume threshold for at least a predetermined audio blank period threshold;
detecting video shot changes in said video data;

detecting semantically meaningful video scenes using detected background audio changes that occur in conjunction with detected video shot changes; and delimiting video segments corresponding to said semantically meaningful video scenes.

29. The method of claim 28, with the step of detecting background audio changes further comprising detecting an audio volume change in said background audio in excess of a predetermined audio volume change threshold.

30. The method of claim 28, with the step of detecting background audio changes further comprising detecting a frequency change in said background audio in excess of a predetermined audio frequency change threshold.

31. The method of claim 28, with the step of detecting background audio changes further comprising the steps of:

generating a frequency data from said audio data;

detecting substantially stable frequency peaks in said frequency data; and detecting a background audio change at a start or stop of said substantially stable frequency peaks.

32. The method of claim 28, with the step of delimiting video segments further comprising inserting indexes into said video data at a beginning of said semantically meaningful video scenes.

33. The method of claim 28, with the step of delimiting video segments further comprising extracting and storing one or more representative video frames from each video segment.

* * * * *

UNITED STATES PATENT AND TRADEMARK OFFICE
CERTIFICATE OF CORRECTION

PATENT NO. : 7,266,287 B2  Page 1 of 1
APPLICATION NO. : 10/020255
DATED : September 4, 2007
INVENTOR(S) : Tong Zhang

It is certified that error appears in the above-identified patent and that said Letters Patent is hereby corrected as shown below:

In column 7, line 4, delete "$0 \leq n \leq N-1$" and insert -- $0 \leq m \leq N-1$ --, therefor.

In column 14, line 4, in Claim 19, after "processor" delete "," and insert -- ; --, therefor.

Signed and Sealed this

Twenty-second Day of July, 2008

JON W. DUDAS
*Director of the United States Patent and Trademark Office*